United States Patent
Pei et al.

(10) Patent No.: US 8,912,763 B2
(45) Date of Patent: Dec. 16, 2014

(54) CHARGER DEVICE

(75) Inventors: He-Ling Pei, Shenzhen (CN); He-Ping Chen, Shenzhen (CN); Shou-Gang Feng, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 416 days.

(21) Appl. No.: 13/447,287

(22) Filed: Apr. 16, 2012

(65) Prior Publication Data
US 2013/0026977 A1     Jan. 31, 2013

(30) Foreign Application Priority Data
Jul. 26, 2011   (CN) .......................... 2011 2 0266470

(51) Int. Cl.
  *H02J 7/06*     (2006.01)
  *H02J 7/24*     (2006.01)
  *H02J 7/00*     (2006.01)
  *H02J 7/04*     (2006.01)
(52) U.S. Cl.
  CPC .............. *H02J 7/0029* (2013.01); *H02J 7/045* (2013.01); *H02J 2007/0037* (2013.01)
  USPC .......................................... 320/163; 320/158
(58) Field of Classification Search
  USPC .................................................. 320/158, 163
  See application file for complete search history.

(56) References Cited

U.S. PATENT DOCUMENTS

| | | | | |
|---|---|---|---|---|
| 4,937,731 A | * | 6/1990 | Konopka | 363/143 |
| 2007/0290655 A1 | * | 12/2007 | Nate et al. | 320/163 |
| 2011/0140673 A1 | * | 6/2011 | Zhang et al. | 320/145 |

FOREIGN PATENT DOCUMENTS

CN         201315498         9/2009

* cited by examiner

*Primary Examiner* — Samuel Berhanu
(74) *Attorney, Agent, or Firm* — Novak Druce Connolly Bove + Quigg LLP

(57) ABSTRACT

A charger device includes a switch, a voltage converter, a constant current circuit, and an automatic disconnecting circuit. The switch is connected to an alternating current (AC) power supply which triggers the charger device to work. The automatic disconnecting circuit is connected to the battery, the voltage converter and the constant current circuit automatically disconnect the voltage converter from the AC power supply when the battery is fully charged. The automatic disconnecting circuit comprises a first resistor, a voltage follower, a second resistor, a first zener diode, a variable resistor, a comparator, a third resistor, a first switch element, a diode and a relay. The relay comprises a coil and a normally-open switch connected between the AC power supply and voltage converter. The normally-open switch turns on or turns off to control a connection between the charger device and the AC power supply.

9 Claims, 4 Drawing Sheets

CHARGER DEVICE

BACKGROUND

1. Technical Field

The disclosure relates to electronic devices, and particularly to a charger device.

2. Description of Related Art

Portable wireless electronic devices are very popular and must be recharged using charger devices. However, the charger devices continue to feed power into the wireless electronic devices after the wireless electronic devices are fully charged, which results in power loss and shortened life of batteries of the wireless electronic devices.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
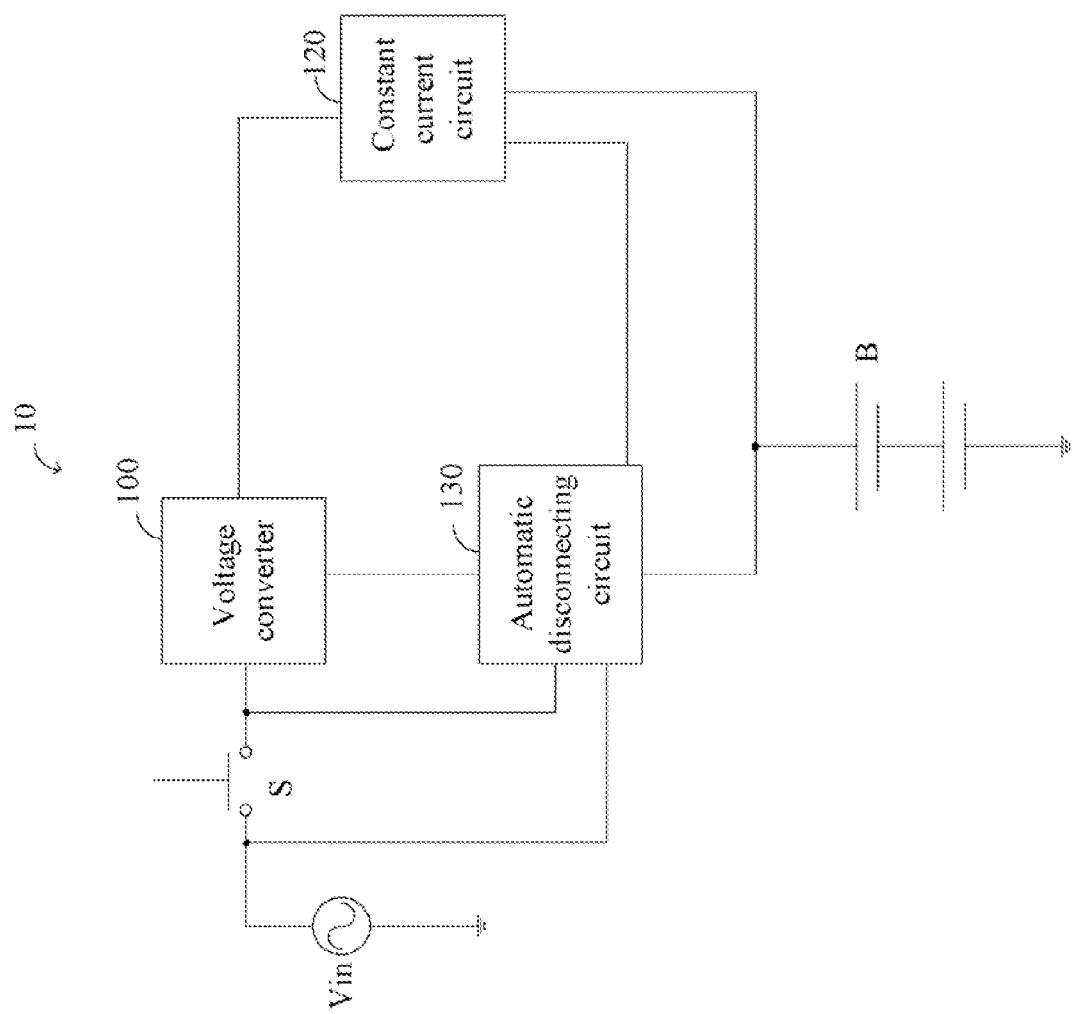
FIG. 1 is a schematic diagram of one embodiment of a charger device as disclosed.

FIG. 1 is a schematic diagram of one embodiment of a charger device 10 as disclosed. In the embodiment, the charger device 10 comprises a switch S, a voltage converter 100, a constant current circuit 120, and an automatic disconnecting circuit 130. The charger device 10 converts alternating current (AC) electrical power supplied by an AC power supply Vin into suitable direct current (DC) electrical power to charge a battery B. The switch S is connected between the AC power supply Vin and the voltage converter 100. The voltage converter 100 converts the AC power supplied by the AC power supply Vin into first DC power. The constant current circuit 120 is connected between an output of the voltage converter 100 and the battery B, and supplies a constant charging current to the battery B. The automatic disconnecting circuit 130 is connected to the AC power supply Vin, the voltage converter 100, the battery B, and the constant current circuit 120, to automatically disconnect the voltage converter 100 from the AC power supply Vin when it detects that the battery B is fully charged.

In the embodiment, the switch S is a push button switch. When the switch S is pushed, the AC power supply Vin is directly connected to the voltage converter 100, and the charger device 10 is triggered to work. When the switch S is released, the AC power supply Vin is indirectly connected to the voltage converter 100 through the automatic disconnecting circuit 130. The automatic disconnecting circuit 130 automatically disconnects the voltage converter 100 from the AC power supply Vin to save power after detecting that the battery B is fully charged.

Figure 2:
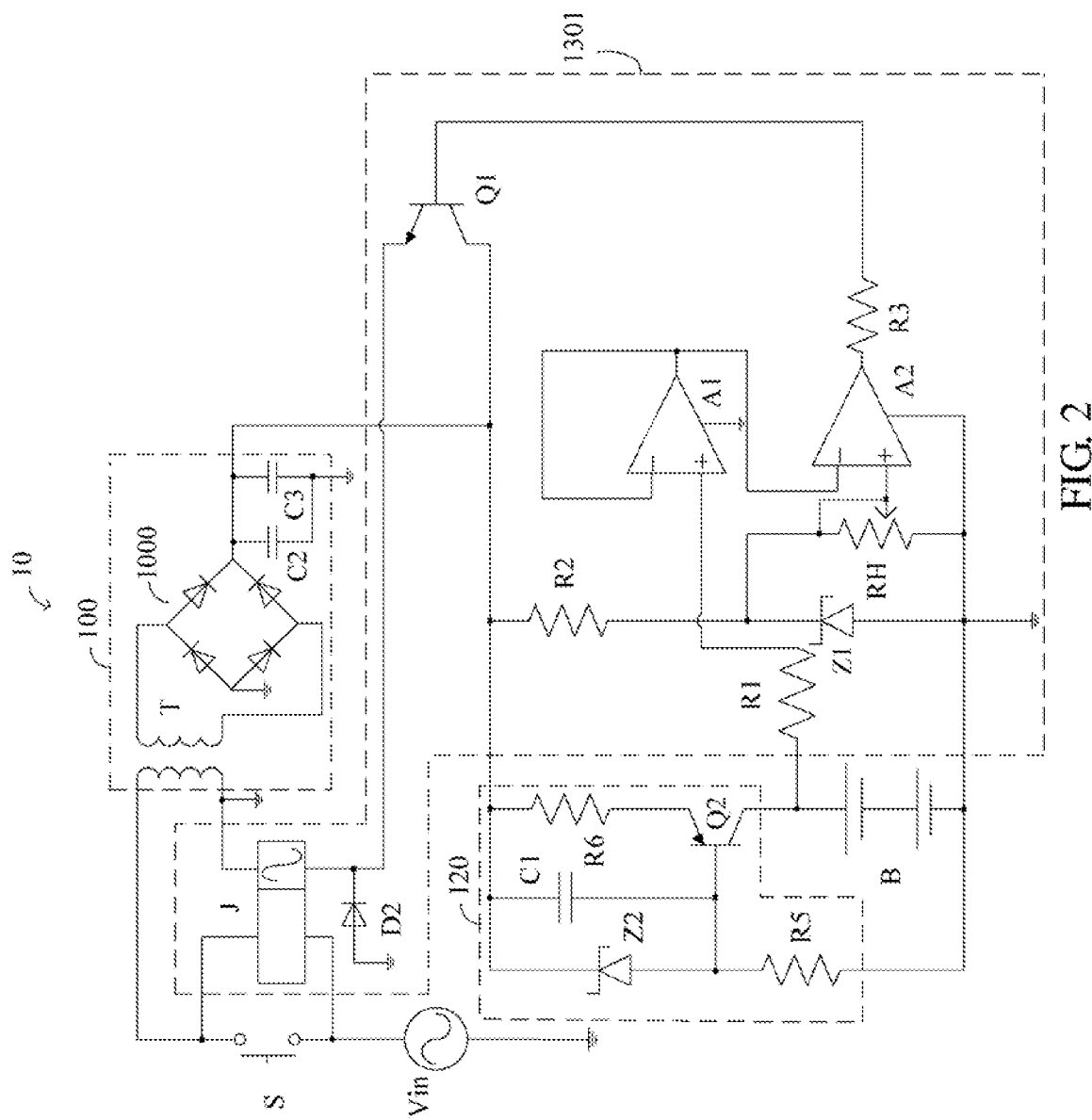
FIG. 2 is a circuit diagram of one embodiment of a charger device.

FIG. 2 is a circuit diagram of one embodiment of the voltage converter 100, the constant current circuit 120, and an automatic disconnecting circuit 1301 of the charger device 10. In the embodiment, the automatic disconnecting circuit 1301 comprises a first resistor R1, a voltage follower A1, a second resistor R2, a first zener diode Z1, a variable resistor RH, a comparator A2, a third resistor R3, a first switch element Q1, a diode D2, and a relay J. The first resistor R1 is connected between a positive pole of the battery B and a non-inverting input of the voltage follower A1. An inverting input of the voltage follower A1 is connected to an output of the voltage follower A1. The second resistor R2 is connected between the output of the voltage converter 100 and a cathode of the first zenor diode Z1. An anode of the first zenor diode Z1 is grounded. The variable resistor RH comprises a first terminal connected to the cathode of the first zenor diode Z1, a second terminal is grounded, and a slider is connected to a non-inverting input of the comparator A2. An inverting input of the comparator A2 is connected to the output of the voltage follower A1.

In the embodiment, the first switch element Q1 comprises a first pole connected to the output of the voltage converter 100, a control pole connected to an output of the comparator A2 through the third resistor R3, and a second pole. A cathode of the diode D2 is connected to the second pole of the first switch element Q1, and an anode of the diode D2 is grounded. The relay J comprises a normally-open switch connected between the AC power supply Vin and the voltage converter 100 in parallel with the switch S, and a coil connected between the second pole of the first switch element Q1 and ground. The normally-open switch turns on or off according to the first switch element Q1 to control a connection between the charger device 10 and the AC power supply Vin.

In the embodiment, the first switch element Q1 is an npn-type transistor. The first pole of the first switch element Q1 is a collector of the npn-type transistor, the control pole of the first switch element Q1 is a base of the npn-type transistor, and the second pole of the first switch element Q1 is an emitter of the npn-type transistor.

In the embodiment, the constant current circuit 120 comprises a second zenor diode Z2, a fifth resistor R5, a first capacitor C1, a sixth resistor R6 and a second switch element Q2. A cathode of the second zenor diode Z2 is connected to the output of the voltage converter 100. The fifth resistor R5 is connected between an anode of the second zenor diode Z2 and ground. The first capacitor C1 is connected to the second zenor diode Z2 in parallel. The second switch element Q2 comprises a first pole connected to the cathode of the second zenor diode Z2 through the sixth resistor R6, a control pole connected to the anode of the zenor diode Z2 and a second pole connected to the positive pole of the battery B.

In the embodiment, the second switch element Q2 is a pnp-type transistor. The first pole of the second switch element Q2 is an emitter of the pnp-type transistor, the control pole of the second switch element Q2 is a base of the pnp-type transistor, and the second pole of the second switch element Q2 is a collector of the pnp-type transistor.

In the embodiment, the voltage converter 100 comprises a transformer T, a bridge rectifier circuit 1000, a second capacitor C2 and a third capacitor C3. The transformer T comprises a primary winding and a secondary winding. The primary winding and the secondary winding of the transformer T both comprise a high voltage pole and a low voltage pole. The high voltage pole of the primary winding is connected to the AC power supply Vin through the switch S, and the low voltage pole of the primary winding is grounded. The bridge rectifier circuit 1000 comprises a first port connected to a high voltage pole of the secondary winding, a second port which is grounded, a third port acting as an output port of the voltage converter 100, and a fourth port connected to a low voltage pole of the secondary winding. The second capacitor C2 is in parallel with the third capacitor C3, and both are connected between the third port of the bridge rectifier circuit 1000 and ground.

In the embodiment, voltage of the non-inverting input of the comparator A2 is set to be equal to voltage of the battery B when fully charged subtracting voltage of the first resistor R1, and is also equal to output voltage of the voltage converter 100 subtracting voltage on the second resistor R2 and voltage on the variable resistor RH between the first terminal and the slider. Therefore, the slider of the variable resistor RH of the charger device 10 can be moved to change the voltage of the non-inverting input of the comparator A2 to charge a battery B of a different specification.

In the embodiment, the transformer T is connected to the AC power supply Vin through the switch S, and converts the AC power supply Vin into another type of AC power when the switch S is pushed down. The other AC power is regulated by the bridge rectifier circuit 1000 and filtered by the second capacitor C2 and the third capacitor C3 forming DC voltage. The second zenor diode Z2 is operated in reverse breakdown mode, which results in the second switch element Q2 turning on. Thus, the DC voltage charges the battery B with constant charging current through the sixth resistor R6 and the second switch element Q2. At this time, the voltage of the non-inverting input of the comparator A2 is higher than the voltage of the inverting input of the comparator A2, so the comparator A2 outputs a high level voltage signal such as 4V. Thus, the first switch element Q1 turns on, there is current flowing through the coil of the relay J, which controls the normally-open switch of the relay J to close and turn on. Therefore, the voltage converter 100 is connected to the AC power supply Vin through the normally-open switch of the relay J, and the charger device 10 works normally. When the battery B is fully charged, the voltage of the non-inverting input of the comparator A2 is lower than the voltage of the inverting input of the comparator A2, thus the comparator A2 outputs a low level voltage signal, such as 0.2V. Thus, the first switch element Q1 turns off, and the coil of the normally-open switch is released and the switch also turns off. Therefore, the voltage converter 100 is disconnected from the AC power supply Vin, and the charger device 10 stops working, saving significantly on power.

Figure 3:
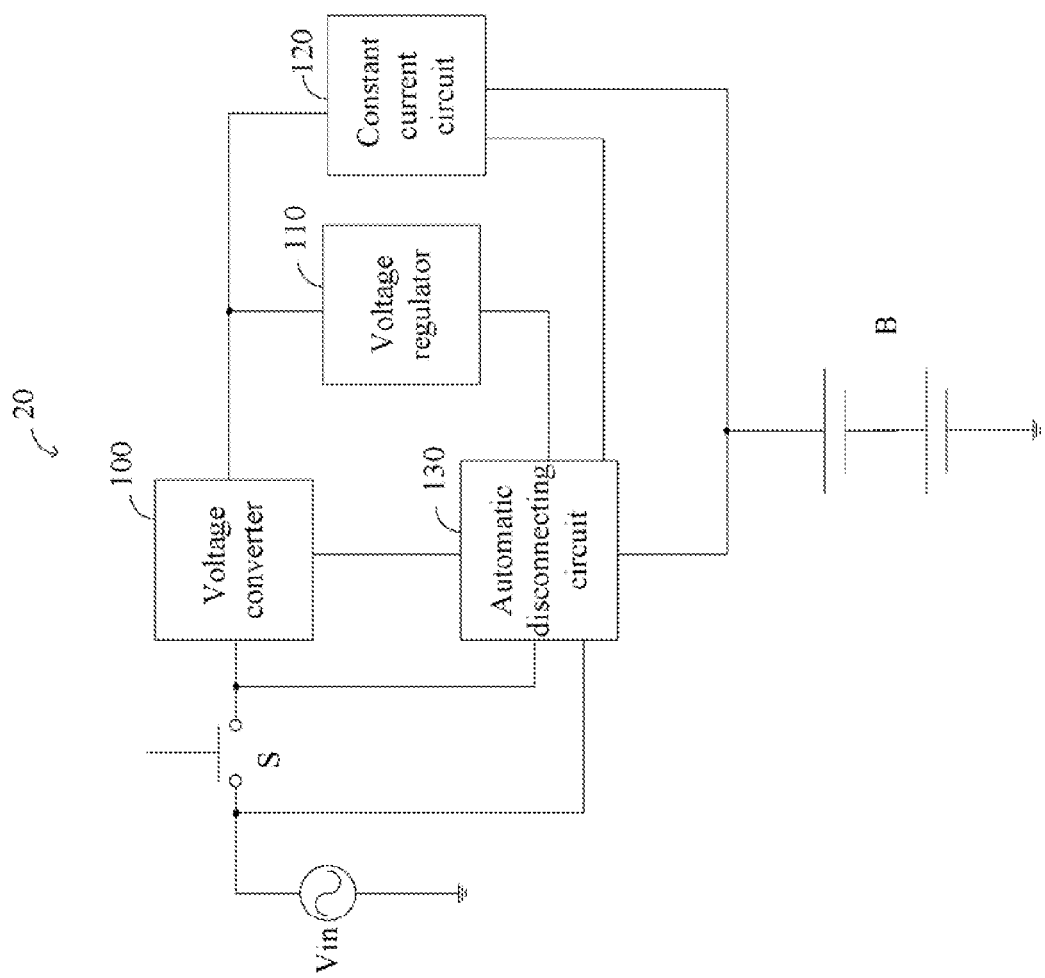
FIG. 3 is a schematic diagram of another embodiment of a charger device as disclosed.

FIG. 3 is a schematic diagram of another embodiment of a charger device 20 as disclosed. In the embodiment, the charger device 20 is similar to the charger device 10 in FIG. 1. The difference between the charger device 20 and the charger device 10 is that the charger device 20 further comprises a voltage regulator 110 connected between the output of the voltage converter 100 and the automatic disconnecting circuit 130 to supply a stable DC power for the automatic disconnecting circuit 130.

Figure 4:
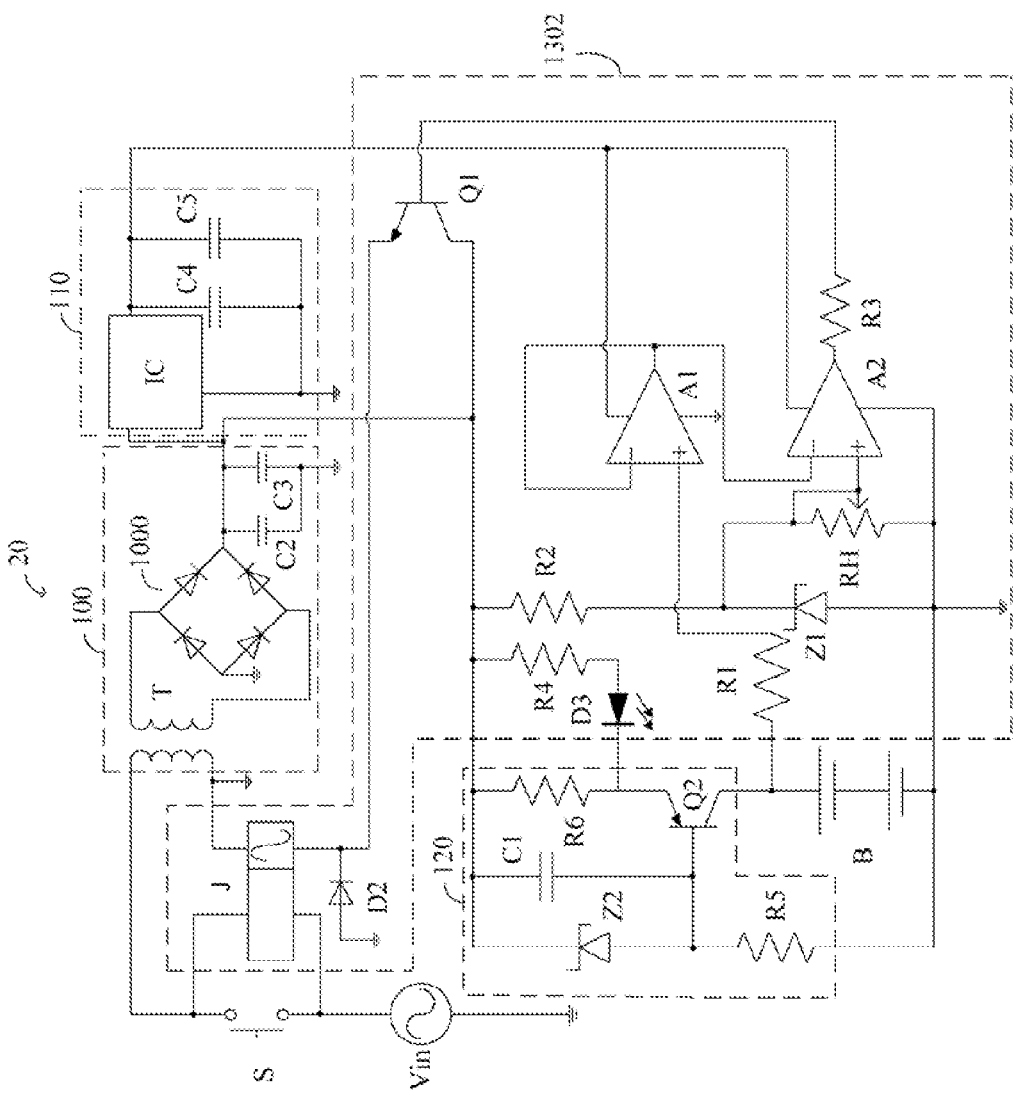
FIG. 4 is a circuit diagram of another embodiment of a charger device.

FIG. 4 is a circuit diagram of another embodiment of the voltage converter 100, the voltage regulator 110, the constant current circuit 120 and an automatic disconnecting circuit 1302 of the charger device 20. In the embodiment, the automatic disconnecting circuit 1302 is similar to the automatic disconnecting circuit 1301 in FIG. 1. The difference between the automatic disconnecting circuit 1302 and the automatic disconnecting circuit 1301 is that the automatic disconnecting circuit 1302 further comprises a fourth resistor R4 connected to the output of the voltage converter 100, and a light emitting diode (LED) D3 comprising a cathode connected to the first pole of the second switch element Q2 of the constant current circuit 120 and an anode connected to the fourth resistor R4, and emitting light when the charger device 20 is working.

In the embodiment, the voltage converter 100 and the constant current circuit 120 of FIG. 2 are the same as those in the FIG. 1.

In the embodiment, the voltage regulator 110 comprises a stable chip IC comprising an input pin connected to the output of the voltage converter 100, an output pin and a ground pin connected to ground, a fourth capacitor C4 connected between the output pin of the stable chip IC and ground, and a fifth capacitor C5 connected in parallel with the fourth capacitor C4.

In the embodiment, the stable chip IC is CW7812.

The charger devices 10 and 20 control the first switch element Q1 to turn on or off, and control the normally-open switch of the relay J to turn on or off according to the state of charge of the battery B, so as to disconnect the battery B from the AC power supply Vin to save power when the battery B is fully charged.

The foregoing disclosure of the various embodiments has been presented for purposes of illustration and description. It is not intended to be exhaustive or to limit the invention to the precise forms disclosed. Many variations and modifications of the embodiments described herein will be apparent to one of ordinary skill in the art in the light of the above disclosure. The scope of the invention is to be defined only by the claims appended hereto and their equivalents.

What is claimed is:

1. A charger device, to convert alternating current power supplied by an alternating current power supply into suitable direct current power to charge a battery, the charger device comprising:

a switch having a first end connected to the alternating current power supply;

a voltage converter connected to a second end of the switch, the voltage converter converting the alternating current power into first direct current power, the voltage converter comprising an output;

a constant current circuit, connected between the output of the voltage converter and a positive pole of the battery, the constant current circuit supplying constant charging current power to the battery; and an automatic disconnecting circuit, connected to the switch, the battery, the voltage converter and the constant current circuit, the automatically disconnecting circuit automatically disconnecting the voltage converter from the alternating current power supply when the battery is fully charged, the automatic disconnecting circuit comprising;

a first resistor having a first end connected to the positive pole of the battery;

a voltage follower, with a non-inverting input connected to a second end of the first resistor and an inverting input connected to an output of the voltage follower;

a second resistor having a first end connected to the output of the voltage converter;

a first zenor diode, comprising a cathode connected to a second end of the second resistor and an anode grounded;

a variable resistor, comprising a first terminal connected to the cathode of the first zenor diode, a second terminal grounded, and a slider;

a comparator, comprising a non-inverting input connected to the slider of the variable resistor, and an inverting input connected to the output of the voltage follower, and an output;

a third resistor having a first end connected to the output of the comparator;

a first switch element, comprising a first pole connected to the output of the voltage converter, a control pole connected to a second end of the third resistor, and a second pole;

a diode, comprising a cathode connected to the second pole of the first switch element and an anode grounded; and a relay, comprising a coil connected between the second pole of the first switch element and the ground, and a normally-open switch connected between the alternating current power supply and the voltage converter, wherein the normally-open switch turns on or off according to the first switch element to control a connection between the charger device and the alternating current power supply.

2. The charger device of claim 1, the automatic disconnecting circuit comprising:

a fourth resistor having a first end connected to the output of the voltage converter; and a light emitting diode, comprising a cathode connected to the constant current circuit and an anode connected to a second end of the fourth resistor, and operable to emit light when the charger device is working.

3. The charger device of claim 2, the constant current circuit comprising:

a second zener diode, comprising a cathode connected to the output of the voltage converter and an anode;

a fifth resistor, connected between the anode of the second zener diode and the ground;

a first capacitor, connected to the second zener diode in parallel;

a six resistor, connected between the output of the voltage converter and the cathode of the light emitting diode; and a second switch element, comprising a first pole connected to the cathode of the light emitting diode, a control pole connected between the anode of the second zener diode and the fifth resistor, and a second pole connected to the positive pole of the battery.

4. The charger device of claim 3, wherein the first switch element is an npn-type transistor, the first pole of the first switch element is a collector of the npn-type transistor, the control pole of the first switch element is a base of the npn-type transistor, and the second pole of the first switch element is an emitter of the npn-type transistor.

5. The charger device of claim 1, wherein the voltage converter comprises:

a transformer, comprising a primary winding and a secondary winding each having a high voltage pole and a low voltage pole, the high voltage pole of the primary winding of the transformer being connected to the alternating current power supply through the switch, and the low voltage pole of the primary winding being grounded;

a bridge rectifier circuit, comprising a first port connected to the high voltage pole of the secondary winding of the transformer, a second port grounded, a third port acted as an output port of the bridge rectifier circuit, and a fourth port connected to the low voltage pole of the secondary winding of the transformer;

a second capacitor, connected between the third port of the bridge rectifier circuit and the ground; and a third capacitor, connected between the third port of the bridge rectifier circuit and the ground.

6. The charger device of claim 1, further comprising:

a voltage regulator, connected between the output of the voltage converter and the automatic disconnecting circuit to supply second direct current power for the automatic disconnecting circuit.

7. The charger device of claim 6, wherein the voltage regulator comprises:

a stable chip, comprising an input pin connected to the output of the voltage converter, an output pin acted as an output of the voltage regulator, and a ground pin grounded;

a fourth capacitor, connected between the output pin of the stable chip and the ground;

a fifth capacitor, connected between the output of the voltage regulator and the ground.

8. An automatic disconnecting circuit connected to a battery, a voltage converter of a charger device, and a constant current circuit, the automatic disconnecting circuit comprising:

a relay, connected between an alternating current power supply connected to the charger device via a switch, and the voltage converter;

a first switch element, comprising a first pole connected to the voltage converter and the constant current circuit, a control pole and a second pole connected to the relay;

a voltage follower having a non-inverting input connected between the constant current circuit through a first resistor and the battery, and an inverting input connected to an output of the voltage follower;

a first zener diode, comprising a cathode connected to the first pole of the first switch element through a second resistor, and an anode grounded;

a variable resistor, comprising a first terminal connected to the cathode of the first zener diode, a second terminal grounded and a slider; and a comparator, comprising a non-inverting input connected to the slider of the variable resistor, and an inverting input connected to the output of the voltage follower, and an output connected to the control pole of the first switch element through a third resistor;

wherein in response to voltage of the inverting input of the comparator being higher than voltage of the non-inverting input, the comparator outputs a low level voltage signal to turn off the first switch element, such that, the relay correspondingly turns off.

9. The charger device of claim 8, wherein the automatic disconnecting circuit further comprises a light emitting diode, the light emitting diode comprising a cathode connected to the constant current circuit and an anode connected to the output of the voltage converter through a fourth resistor, and operable to emit light when the charger device is working.

* * * * *